US010542471B1

(12) United States Patent
Oroskar et al.

(10) Patent No.: US 10,542,471 B1
(45) Date of Patent: Jan. 21, 2020

(54) METHOD AND SYSTEM FOR RELEASING AT LEAST ONE RESOURCE ALLOCATED TO A USER EQUIPMENT DEVICE

(71) Applicant: Sprint Spectrum L.P., Overland Park, KS (US)

(72) Inventors: Siddharth S. Oroskar, Overland Park, KS (US); Maulik K. Shah, Overland Park, KS (US); Ryan P. Dreiling, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 518 days.

(21) Appl. No.: 13/970,957

(22) Filed: Aug. 20, 2013

(51) Int. Cl.
*H04W 36/00* (2009.01)
*H04W 72/04* (2009.01)
*H04W 28/16* (2009.01)

(52) U.S. Cl.
CPC .............................. *H04W 36/0083* (2013.01)

(58) Field of Classification Search
None
See application file for complete search history.

(56) References Cited

U.S. PATENT DOCUMENTS

| RE45,133 E | 9/2014 | Wu |
| 2005/0054336 A1 | 3/2005 | Sanding |
| 2008/0320149 A1 | 12/2008 | Faccin |
| 2012/0044868 A1 | 2/2012 | Faccin et al. |
| 2013/0265884 A1* | 10/2013 | Brombal et al. ............... 370/242 |
| 2014/0179318 A1* | 6/2014 | Wang ................. H04W 36/0022 455/436 |
| 2015/0056993 A1* | 2/2015 | Zhu et al. .................. 455/435.1 |

OTHER PUBLICATIONS

Unpublished U.S. Appl. No. 14/191,541, filed Feb. 27, 2014, with inventor Saravana Velusamy, entitled "Bearer Management in the Presence of Circuit-Switched Fallback".
U.S. Appl. No. 14/191,541, Advisory Action dated May 18, 2016 (8 pages).
U.S. Appl. No. 14/191,541, Final Office Action dated Feb. 18, 2016 (22 pages).
U.S. Appl. No. 14/191,541, First Action Interview Pilot Program Pre-Interview Communication dated May 1, 2015 (16 pages).
U.S. Appl. No. 14/191,541, First Action Interview Office Action dated Sep. 14, 2015 (12 pages).

* cited by examiner

*Primary Examiner* — Jason E Mattis
*Assistant Examiner* — Hong Shao

(57) ABSTRACT

A method and system to help manage resources in a fallback scenario is disclosed. A first network may be configured to serve user equipment devices (UEs) according to a first protocol and a second network may be configured to serve UEs according to a second protocol. The method may involve the first network serving a UE, where serving the UE includes allocating at least one resource to the UE. The method may also involve, after the UE has transitioned from being served by the first network to being served by the second network for a circuit-switched-fallback call, (i) if the UE completes call setup, the first network releasing the resources, but (ii) if the UE does not complete call setup, the first network using the allocated resources to serve the UE after the UE transitions back to being served by the first network.

18 Claims, 6 Drawing Sheets

METHOD AND SYSTEM FOR RELEASING AT LEAST ONE RESOURCE ALLOCATED TO A USER EQUIPMENT DEVICE

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA) (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or "carriers." More particularly, the base station that radiates to define a given coverage area may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carrier frequencies with each supported band. In a frequency division duplex (FDD) arrangement, different carrier frequencies are used for the downlink than the uplink. Whereas, in a time division duplex (TDD) arrangement, the same carrier frequency is used for the downlink and uplink and is allocated over time among downlink and uplink communications.

On each carrier frequency in a coverage area, the coverage area may also define a number of air interface channels for carrying information between the base station and the WCDs. These channels may be defined in various ways, such as through frequency division multiplexing, time division multiplexing, and/or code-division multiplexing, for instance. By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resources for carrying communication traffic such as voice data and other data between the base station and WCDs.

When a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

OVERVIEW

A method and system for releasing at least one resource allocated to a user equipment device (UE) is disclosed. An example method is operable in a communication system comprising a first network configured to serve UEs according to a first air interface protocol and a second network configured to serve UEs according to a second air interface protocol. The method involves the first network serving a UE, wherein the first network serving the UE comprises the first network allocating at least one resource to the UE. Further, the method involves the first network signaling to invoke setup of a circuit-switched-fallback (CSFB) call between the UE and a call destination via the second network, wherein the UE transitions from being served by the first network to being served by the second network. Still further, the method involves, after the UE has transitioned from being served by the first network to being served by the second network, (i) the first network initially maintaining for the UE the at least one resource allocated to the UE, (ii) the first network receiving a notification message indicating that setup of the CSFB call between the UE and the call destination is complete, and (iii) in response to receiving the notification message, the first network releasing the at least one resource allocated to the UE.

In another example, the method involves the first network serving a UE, wherein the first network serving the UE comprises the first network allocating at least one resource to the UE. Further, the method involves the first network signaling to invoke setup of a CSFB call between the UE and a call destination via the second network, wherein the UE transitions from being served by the first network to being served by the second network. Still further, the method involves, after the UE has transitioned from being served by the first network to being served by the second network, (i) if the UE completes call setup, the first network releasing the at least one resource, but (ii) if the UE does not complete call setup and the UE transitions back to being served by the first network, the first network using the allocated at least one resource to serve the UE after the UE transitions back to being served by the first network.

In another example, the method is operable in a communication system comprising a first radio access network (RAN) configured to serve UEs according to a first air interface protocol and a second RAN configured to serve UEs according to a second air interface protocol, wherein the first RAN has at least one resource allocated for the UE to be served by the first RAN. The method involves the second RAN serving the UE, wherein the second RAN serving the UE comprises the second RAN setting up a call connection to the UE. Further, the method involves, in response to the second RAN setting up the call connection to the UE, the first RAN releasing the at least one resource allocated for the UE to be served by the first RAN.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
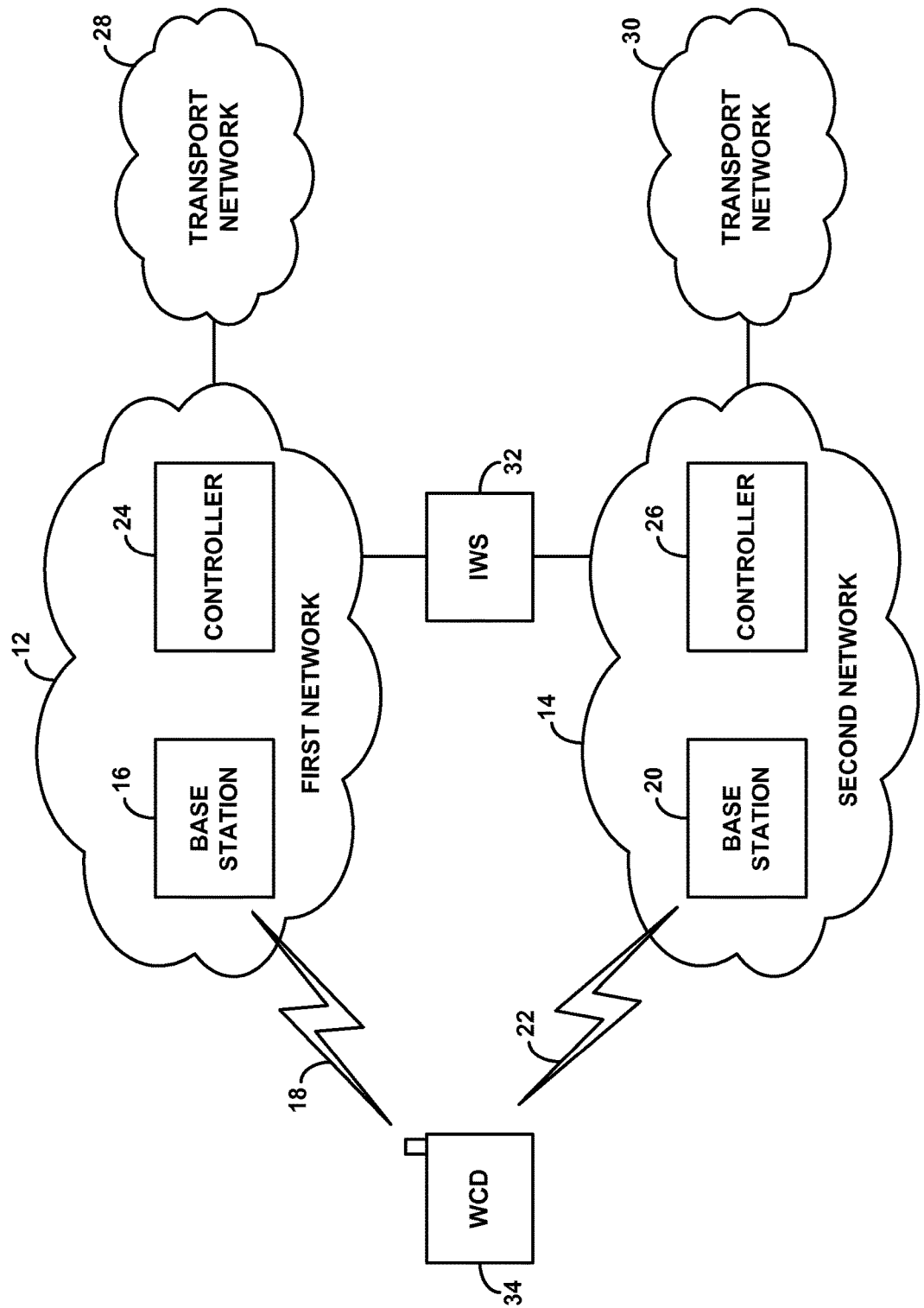
FIG. 1 is a simplified block diagram of a network arrangement in which an exemplary embodiment of the present method and apparatus can be implemented.

1. Overview of an Example Method and System

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. This CSFB functionality may, for example, include standard CSFB functionality and/or enhanced circuit switched fallback (eCSFB) functionality.

When CSFB functionality is implemented, for instance, a hybrid CDMA/LTE WCD may be arranged by default to scan for and register with an LTE network and to operate with its CDMA radio powered off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then power on its CDMA radio and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA carriers on which the local CDMA network provides service. And the WCD may use its CDMA radio to scan for coverage on each of the listed CDMA carriers and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area and traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA carriers on which the local CDMA network provides service. The WCD may then similarly tune to CDMA and scan for coverage on each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA. This CSFB call setup process allows the WCD to engage in CDMA voice call setup through its existing LTE connection, without the need for the WCD to be idling in CDMA coverage in the first place.

Under LTE, when the LTE network is serving a WCD (i.e., a UE), the LTE network may allocate at least one resource to the UE and may use that at least one resource to serve the UE. For example, the LTE network may allocate a bearer to the UE and may use that bearer to serve the UE. However, when a UE transfers to the CDMA network in a CSFB scenario, the LTE network may release the at least one resource allocated to the UE, so as to make the at least one resource available to one or more other UEs being served by the LTE network. The LTE network may release the at least one resource allocated to the UE at various times. In a common example, the LTE network releases the at least one resource allocated to the UE in response to the UE transferring from the LTE network to the CDMA network to be served by the CDMA network. Unfortunately, however, a problem with this process of releasing the at least one resource allocated to the UE is that, for one reason or another, the UE may transition back to the LTE network before setup of the CSFB call between the UE and the call destination is complete. In an example, the UE may not receive caller-ID information until the UE is actually within coverage of the CDMA network, and there is a chance that a user of the UE may reject the CSFB call once the UE is actually within coverage of the CDMA network. In such a case, the UE may thus transition from being served by the CDMA network back to being served by the LTE network without completing setup of or engaging in the CSFB call.

However, in such an example, since the LTE network would have already released the at least one resource when the UE transitioned to being served by the CDMA network, the UE would need to reselect the LTE network (e.g., through better system reselection (BSR) or cell reselection) and follow standard procedures to connect to the LTE network. This reconnection process may involve, for instance, the assignment of different resources to serve the UE. This process may pose problems, for example, during a wireless packet data communication service such as video streaming or other LTE applications. Thus, if the UE cancels or rejects the CSFB call, the LTE network releasing the resources in response to the UE transitioning to the second network may be inefficient.

In another example, the LTE network may wait a set time period before releasing the at least one resource allocated to the UE by the LTE network. For instance, the LTE network may be configured to release the at least one resource a certain amount of time (e.g., 10 seconds) after the UE transitions from the LTE network to the CDMA network to be served by the CDMA network. Unfortunately, however, a problem with this process of releasing the at least one resource at a set time after the transition is that the at least one resource may be reserved by the LTE network for the UE longer than necessary. For example, should the UE complete the call setup and engage in the CSFB call, the at least one resource may still be reserved for the UE by the LTE network even while the UE is engaged in the CSFB call on the CDMA network. Thus, the LTE network waiting a set time period before releasing the at least one resource may be an unproductive and inefficient use of resources.

The disclosed method and system offers an improved way to manage in a fallback communication situation (such as a CSFB call for instance) the release of at least one resource allocated to the UE. In particular, the disclosed method and system may take into account call-setup completion. In accordance with the disclosure, a first network (e.g., an LTE network) may be serving a UE, and serving the UE may involve the first network allocating at least one resource to the UE. The first network may engage in a process to facilitate setup of a communication for the UE to be served by a second, fallback network (e.g., a CDMA network). The first network may wait to release the at least one resource allocated to the UE until the first network receives a notification indicating that setup of the communication is complete. This process may thus help to reserve the resources allocated to the UE in the event that the user cancels or ignores the CSFB call, while also avoiding inefficient use of resources after a UE has completed setup of the CSFB call.

Accordingly, in one example aspect, disclosed is a method that may be implemented in a communication system that includes a first network configured to serve UEs according to a first air interface protocol and a second network configured to serve UEs according to a second air interface protocol. The method involves the first network serving a UE, wherein the first network serving the UE comprises the first network allocating at least one resource to the UE. Further, the method involves the first network signaling to invoke setup of a CSFB call between the UE and a call destination via the second network. The UE may then transition from being served by the first network to being served by the second network. Still further, the method involves after, the UE has transitioned from being served by the first network to being served by the second network, (i) the first network initially maintaining for the UE the at least one resource allocated to the UE, (ii) the first network receiving a notification message indicating that setup of the CSFB call between the UE and the call destination is complete, and (iii) in response to receiving the notification message, the first network releasing the at least one resource allocated to the UE.

2. Example Communication System Architecture

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18, and network 14 includes a representative base station 20 that radiates to provide a coverage area 22. As discussed above, each such coverage area may operate on one or more carriers.

Each network may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network 14 includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24, 26 and/or other elements of the networks. For instance, in the context of the present disclosure, the IWS may function to pass CSFB call setup messages or similar setup messages between the networks.

Network 12 and network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14. WCD 34 may then idle in coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having base station 16 transmit a CSFB page message to the WCD in coverage area 18. In line with the example CSFB procedures described above, once the WCD responds to this CSFB page, the WCD may then send a CSFB extended service request message to base station 16 to request setup of the CSFB communication. And likewise, when the WCD seeks to place a CSFB call, the WCD may establish connectivity with base station 16 and may send a CSFB extended service request message to base station 16 to request setup of that CSFB communication.

In either case, base station 16 may then transmit to the WCD a list of carriers of the second network 14 for the WCD to scan in search of coverage in which to engage in the communication. In practice, for instance, given the example association between these networks, base station 16 may be provisioned to provide as the list of carriers those on which base stations of network 14 operate. The WCD may then scan those carriers of network 14 in search of coverage and may report one or more strongest detected pilots in a measurement report to base station 16 of network 12.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication. And the network 14 may return to IWS 32 a handover direction message directing the WCD take transition to that coverage area and channel to engage in the communication. IWS 32 may then pass that handover direction message to network 12, and base station 16 may transmit the message in coverage area 18 to the WCD. The WCD may then transition to be served by the indicated coverage area and channel of network 14. After the WCD transitions to the network 14, the WCD may then complete setup of the CSFB call so as to engage in the communication. In another example, after the WCD transitions to the network 14, call setup may fail, and the WCD may then transition back to network 12.

Figure 2:
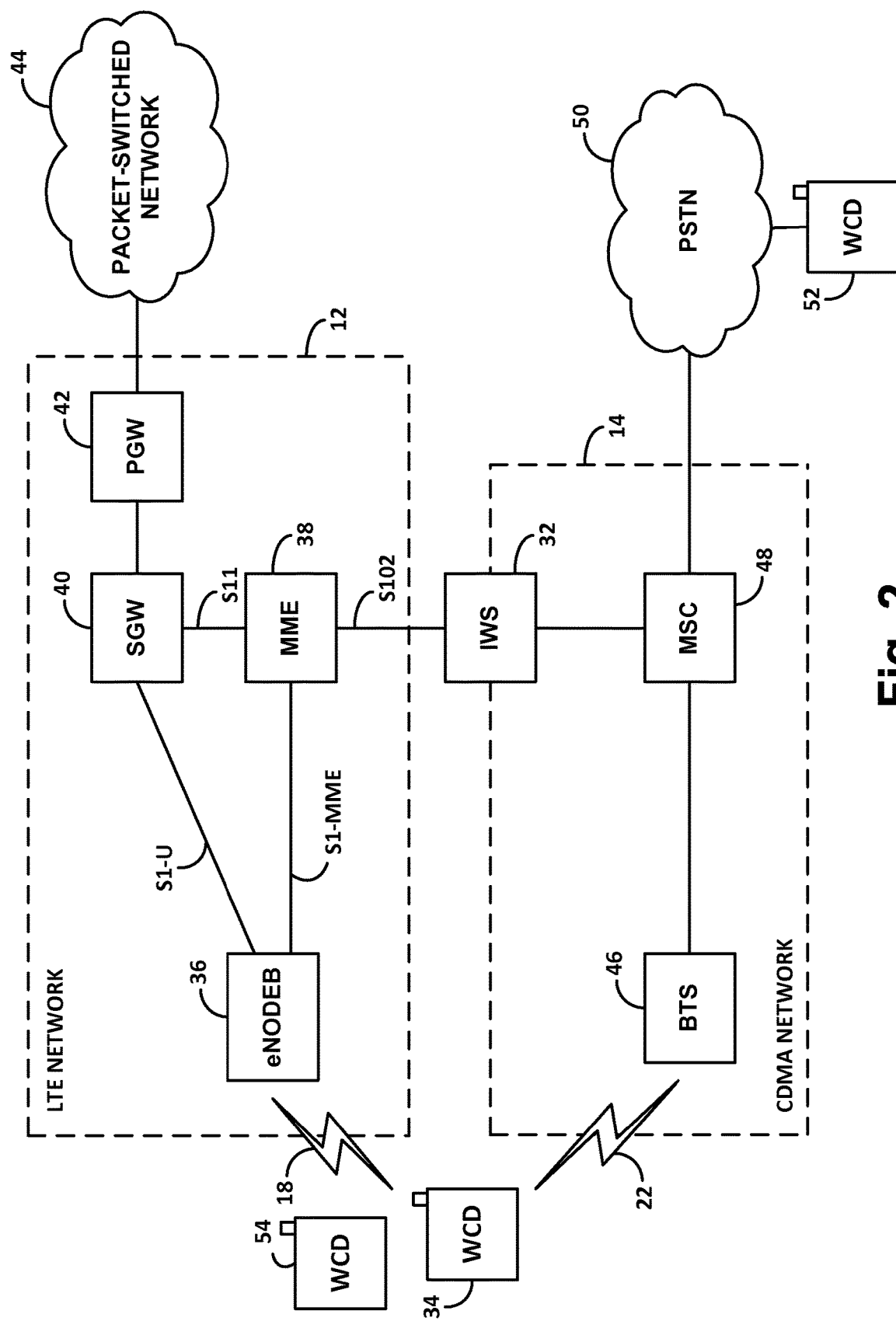
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

The CDMA network 14, on the other hand, is shown including a representative CDMA base station 46 known as a base transceiver station (BTS), which includes an antenna structure and associated equipment for engaging in CDMA communication over the air interface of coverage area 22 with WCDs. The BTS 46 is then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50.

Further shown in FIG. 2 is then the IWS 32, which functions to facilitate interworking between the LTE network 12 and the CDMA network 14 as discussed above, so as to facilitate CSFB functionality for instance and to facilitate various specific features of the present disclosure.

In practice with this LTE/CDMA arrangement, the LTE eNodeB 36 may broadcast an overhead signal such as a System Information Block #8 (SIB8) that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in coverage area 18 of eNodeB 36. For instance, eNodeB 36 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (in cooperation with a home location register and/or other network infrastructure) may register the fact that the WCD is currently served by the LTE network 12. The LTE network may serve the WCD. For instance, the LTE network may assign at least one resource to the WCD (e.g., a bearer) and may use that at least one resource to serve the WCD.

When the MSC 48 receives a request to connect a call to the WCD, the MSC may then send to the IWS 32 a page request, and the IWS may in turn signal to the MME 38. The MME may then signal to the eNodeB to trigger paging of the WCD over the LTE air interface. The eNodeB may then transmit a CSFB page to the WCD, to which the WCD may respond, and the WCD may transmit to the eNodeB a CSFB extended service request message, which the eNodeB may forward to the MME. And likewise, if the WCD seeks to originate a CSFB call, the WCD may establish connectivity with the eNodeB if necessary and may then send a CSFB extended service request message to the eNodeB, which the eNodeB may similarly forward to the MME. After the WCD transitions to the network 14, the WCD may then complete setup of the CSFB call so as to engage in the communication.

In accordance with the disclosure, the LTE network 12 may have at least one resource allocated to a UE such as WCD 34 in order to serve the UE. Further, LTE network 12 may take into account whether the UE completes setup of a CSFB call before releasing the at least one resource allocated to the UE. In particular, after a UE has transitioned from being served by the LTE network 12 to being served by the CDMA network 14 for a CSFB call, the LTE network 12 may initially maintain for the UE the at least one resource allocated to the UE. The LTE network 12 may then receive receiving a notification message indicating that setup of the CSFB call between the UE and the call destination is complete. In response to receiving the notification message, the LTE network 12 may release the at least one resource allocated to the UE. On the other hand, if the UE does not complete call setup and the UE transitions back to being served by the LTE network 12, the LTE network may use the allocated resources to serve the UE after the UE transitions back to being served by the LTE network.

3. Example Network Element Components

Figure 3:
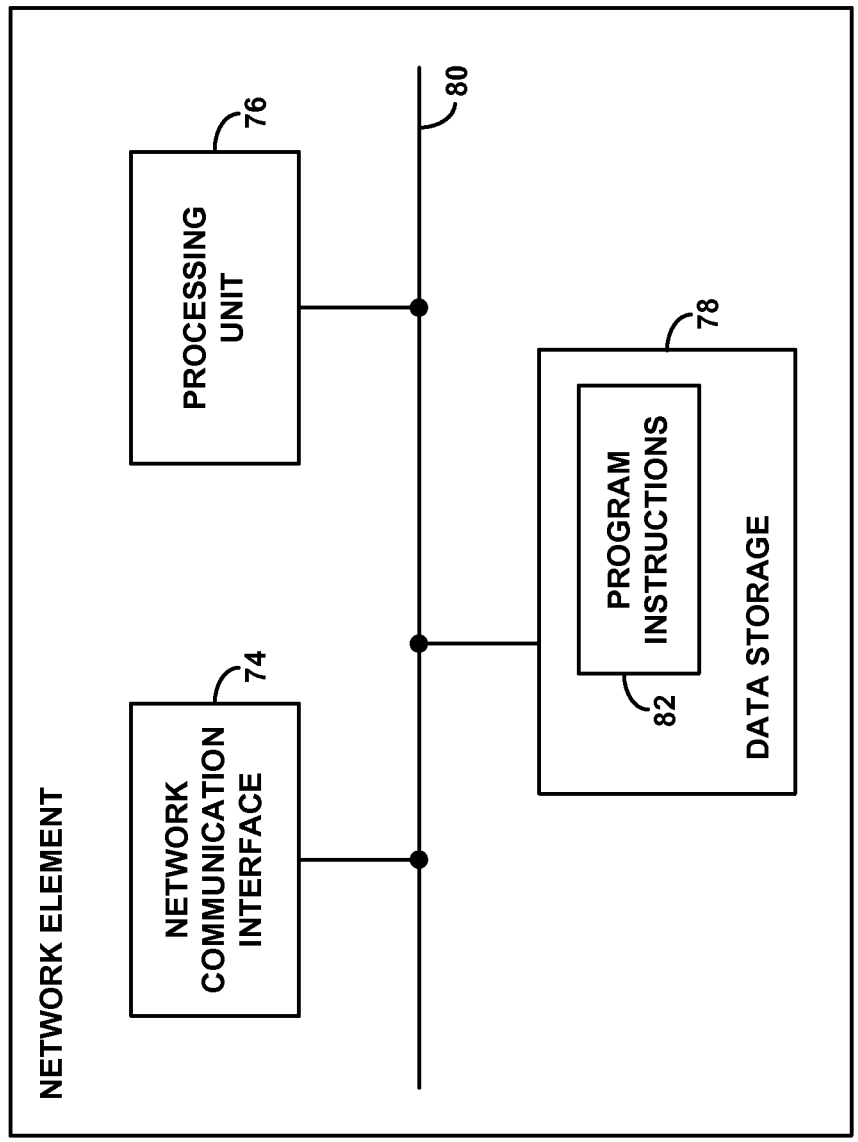
FIG. 3 is a simplified block diagram of a network element operable in a network arrangement such as that depicted in FIGS. 1 and 2.

FIG. 3 is next a simplified block diagram of a network element showing some of the physical components that such an element may include. This block diagram may represent any of a variety of the network elements shown in FIGS. 1 and 2 for instance.

As shown in FIG. 3, the network element includes a network communication interface 74, a processing unit 76, and data storage 78, all of which may be communicatively linked together by a system bus, network, or other connection mechanism 80. With this arrangement, the network communication interface may function to provide for communication with various other network elements and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 78 may comprise one or more volatile and/or non-volatile storage components, such as optical, magnetic, or flash memory and may be integrated in whole or in part with the processing unit. As shown, by way of example, data storage 78 may then comprise program instructions 82, which may be executable by processing unit 76 to carry out various functions described herein.

In an exemplary embodiment, data storage 78 may include program instructions that are executable to cause a first wireless network (e.g., LTE network 12) or at least one component of the first wireless network to perform functions comprising: (a) serving a UE, wherein the first network serving the UE comprises the first RAN allocating at least one resource to the UE; (b) signaling to invoke setup of a CSFB call between the UE and a call destination via a second network; and (c) after the UE has transitioned from being served by the first network to being served by the second network, (i) initially maintaining for the UE the at least one resource allocated to the UE, (ii) receiving a notification message indicating that setup of the CSFB call between the UE and the call destination is complete, and (iii) in response to receiving the notification message, releasing the at least one resource allocated to the UE.

4. Example Operation

Figure 4:
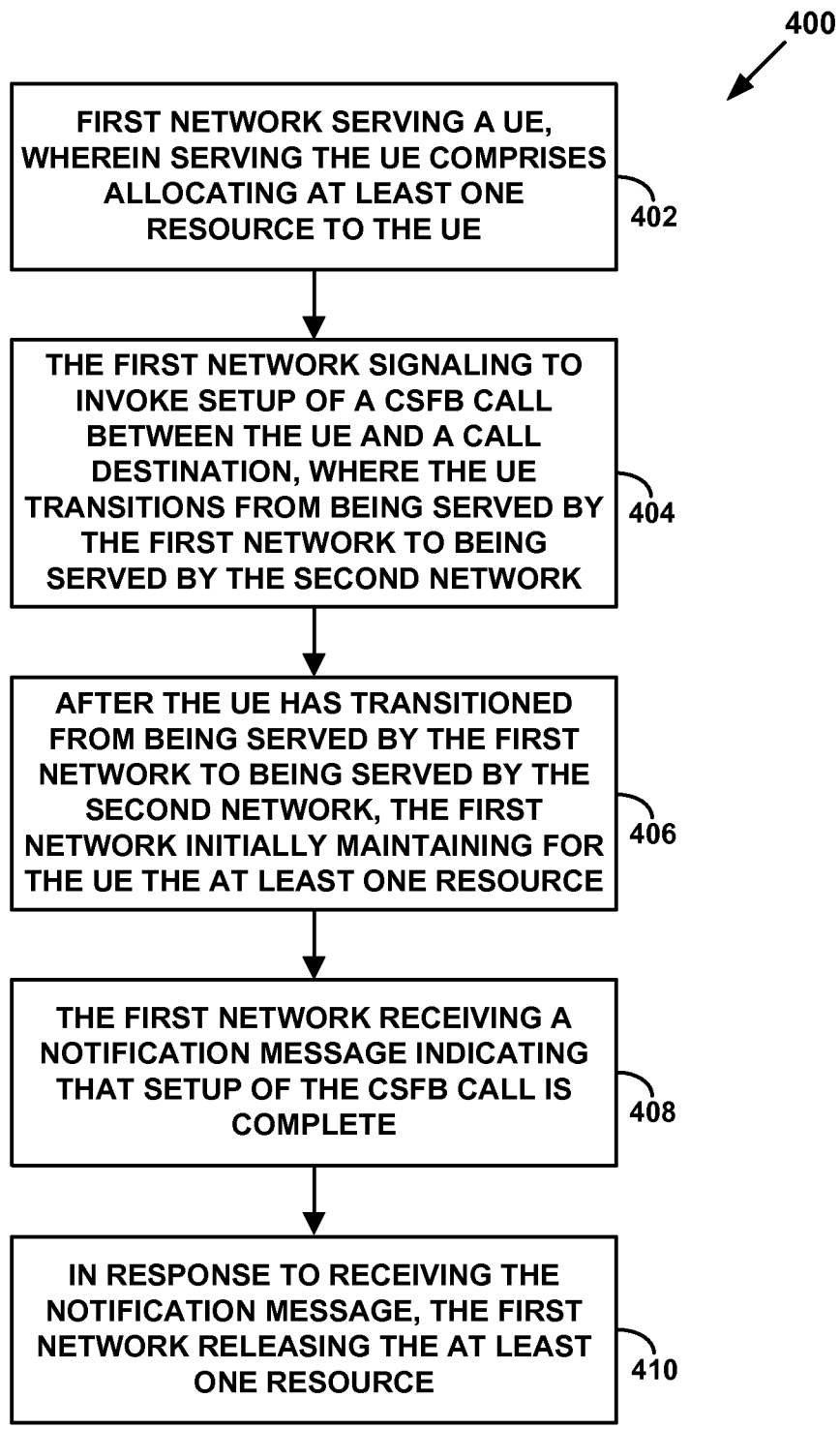
FIG. 4 is a flow chart depicting functions that can be carried out in accordance with an example method.

FIG. 4 is next a flow chart depicting a method 400 that can be carried out in accordance with the present disclosure, in an arrangement such as that depicted in FIG. 1 or more specifically in FIG. 2 for instance, and that can thus be implemented by one or more of the illustrated network elements as discussed above.

As shown in FIG. 4, at block 402, the method involves, a first network serving a UE, wherein the first network serving the UE comprises the first network allocating at least one resource to the UE. In turn, the method involves, at block 404, the first network signaling to invoke setup of a CSFB call between the UE and a call destination via a second network. The UE may then transition from being served by the first network to being served by the second network. The method then involves, after the UE has transitioned from being served by the first network to being served by the second network, (i) at block 406, the first network initially maintaining for the UE the at least one resource allocated to the UE, (ii) at block 408, the first network receiving a notification message indicating that setup of the CSFB call between the UE and the call destination is complete, and (iii) at block 410, in response to receiving the notification message, the first network releasing the at least one resource allocated to the UE.

In an example embodiment, these functions of method 400 could be carried out by a first wireless network such as LTE network 12 illustrated in FIG. 2. Further, the second network may be a second network such as CDMA network 14, and the UE may be a WCD such as WCD 34. Still further, the method 400 may be carried out by a component or a combination of components of the first wireless network 12. For example, the method may be carried out by a first wireless network node such as eNodeB 36, or the method may be carried out by a combination of network elements such as eNodeB 36 and MME 38. Other examples are possible as well.

Returning to FIG. 4, at block 402, first network 12 serves UE 34, and serving the UE 34 may involve the first network allocating at least one resource to the UE. For example, the first network may allocate a bearer to the UE and may use that bearer to serve the UE with a data connection. In another example, the at least one resource may include a context resource, such as a context record, stored at the PGW, SGW, MME, eNodeB, or the like, for the UE. Other example resources are possible as well.

As UE 34 is being served by first network 12, the UE may either receive a call from a call destination such as WCD 52 or place a call to a call destination such as WCD 52. The method may then involve, at block 404, first network 12 signaling to invoke set up of a CSFB call (e.g., a standard CSFB call or an eCSFB call) between the UE and the call destination via second network 14. The first network may signal to invoke setup of the CSFB call between the UE and the call destination via the second network in response to the call destination originating a call to the UE. In another example, the first network may signal to invoke setup of the CSFB call between the UE and the call destination via the second network in response to receiving an origination request from the UE for a call to the call destination.

First network 12 may use various network components in order to signal to invoke set up of a CSFB call between UE 34 and call destination 52 via second network 14. For instance, the signaling to invoke setup of the CSFB call between the UE and the call destination via the second network may include signaling that results in MME 38 invoking setup of the CSFB call.

In an example, MME 38 invoking setup of the CSFB call includes signaling from the MME to switch 48 via the IWS 32 to cause the switch to (i) page the UE to cause the UE to transition to be served by the second network and (ii) connect the CSFB call between the UE and the destination via PSTN 50.

In response to the signaling to invoke setup of the CSFB call, UE 34 may transition from being served by first network 12 to being served by second network 14. After transitioning to being served by the second network, the UE and the second network may signal in order to complete setup of the CSFB call. On the other hand, the user of the UE may cancel or reject the CSFB call, and thus the UE may not complete setup of the CSFB call.

At block 406, after UE 34 has transitioned from being served by first network 12 to being served by second network 14, the first network may initially maintain for the UE the at least one resource allocated to the UE. As mentioned above, the UE may transition from being served by the first network to being served by the second network prior to completion of setup of the CSFB call between the UE and the call destination. The first network may initially maintain for the UE the at least one resource allocated to the UE in order to reserve the resources for the UE, should the UE reject or cancel the CSFB call (and thereafter return to the first network). In such a case, first network 12 may again use the allocated at least one resource to serve UE 34. Beneficially, in the event that the UE does not complete call setup and transitions back to the first network, this disclosed method may thus decrease the time it takes for the UE to reconnect to the first network in order to once again be served by the first network. In particular, in an example of the disclosed method, since the first network has maintained the at least one resource allocated to the UE, the first network may begin to once again serve the UE using the reserved at least one resource.

At block 408, after UE 34 has transitioned from being served by first network 12 to being served by second network 14, the first network may receive a notification message indicating that setup of the CSFB call between the UE and call destination 52 is complete. The act of receiving the notification may take various forms. For example, MME 38 may receive the notification message from MSC 48 via IWS 32. In another example, eNodeB 36 may receive the notification message. Other examples are possible as well.

At block 410, in response to receiving the notification message, first network 12 may release the at least one resource allocated to UE 34. By releasing the at least one resource allocated to the UE 34, the first network 12 may use that at least one resource to serve one or more other UEs operating under the coverage of the first network 12, such as WCD 54. In another example, the first network 12 may release the at least one resource allocated to UE 34 and suspend use of the at least one resource until the UE returns to the first network (e.g., after completion of the CSFB call). For instance, the first network 12 may release the allocated bearer but may maintain a stored context record for the UE 34. In such a case, by releasing the bearer, the first network 12 will suspend use of the bearer. When the UE 34 returns to the first network 12 (e.g., after completing the CSFB call), the first network may refer to the maintained context record. This maintained context record may include information about the released (i.e., suspended) bearer. The first network 12 may then use the suspended bearer to serve the UE once again.

Figure 5:
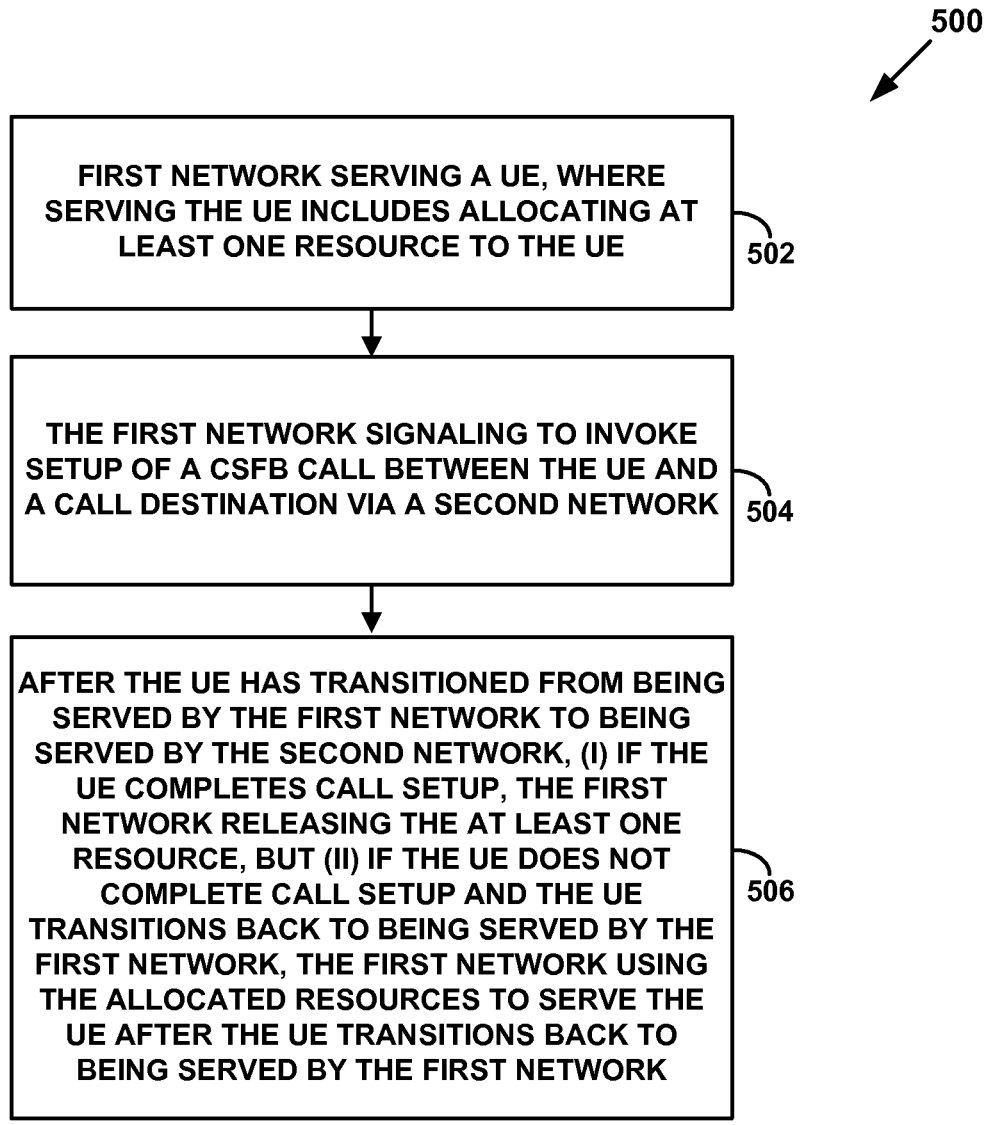
FIG. 5 is another flow chart depicting functions that can be carried out in accordance with an example method.

FIG. 5 is next another flow chart depicting a method 500 that can be carried out with a network arrangement such as that shown in FIG. 2 for instance. For example, method 500 may be carried out by LTE network 12. Furthermore, method 500 is similar in some respects to the method 400, and thus is not described in as great of detail. It should be explicitly noted, however, that any possibilities and permutations described above with respect to method 400 may equally apply to method 500, and vice versa.

As shown in FIG. 5, method 500 involves, at block 502, a first network serving a UE, wherein the first network serving the UE comprises the first network allocating at least one resource to the UE. The method then involves, at block 504, the first network signaling to invoke setup of a CSFB call between the UE and a call destination via a second network. As a result of this signaling, the UE may then transition from being served by the first network to being served by the second network. After the UE has transitioned from being served by the first network to being served by the second network, the method then involves, at block 506, (i) if the UE completes call setup, the first network releasing the at least one resource, but (ii) if the UE does not complete call setup and the UE transitions back to being served by the first network, the first network, using the allocated resources to serve the UE after the UE transitions back to being served by the first network.

The method may involve the first network making a determination of whether the UE completes call setup. If the determination is that the UE completed call setup, the first network may responsively first network release the at least one resource. In an example, the first network releases the at least one resource in response to receiving a notification message indicating that setup of the CSFB call between the UE and the call destination is complete. If the determination is that the UE did not complete call setup and that the UE has transitioned back to the first network, the first network may responsively use the allocated resources to serve the UE after the UE transitions back to being served by the first network.

Figure 6:
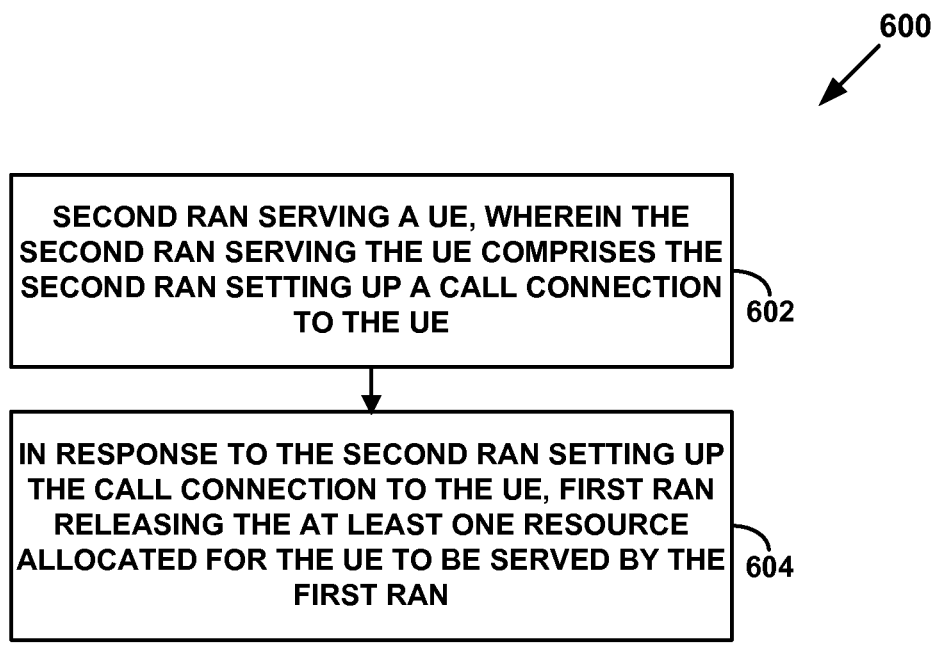
FIG. 6 is another flow chart depicting functions that can be carried out in accordance with an example method.

FIG. 6 is next another flow chart depicting a method 600 that can be carried out with a network arrangement such as that shown in FIG. 2 for instance. Furthermore, method 600 is similar in some respects to the method 400, and thus is not described in as great of detail. It should be explicitly noted, however, that any possibilities and permutations described above with respect to method 400 may equally apply to method 600, and vice versa.

As a preliminary matter, method 600 may be operable in a communication system comprising a first radio access network (RAN) configured to serve UEs according to a first air interface protocol and a second RAN configured to serve UEs according to a second air interface protocol, wherein the first RAN has at least one resource allocated for the UE to be served by the first RAN. Method 600 may involve, at block 602, the second RAN serving the UE, wherein the second RAN serving the UE comprises the second RAN setting up a call connection to the UE. Method 600 may then involve, at block 604, in response to the second RAN setting up the call connection to the UE, the first RAN releasing the at least one resource allocated for the UE to be served by the first RAN.

Method 600 may further include other functions. For example, method 600 may include the second RAN sending to the first RAN a notification message indicating that setup of the call connection for the UE is complete. As another example, method 600 may include the first RAN receiving from the second RAN the notification message, wherein the first RAN releasing the at least one resource comprises the first RAN releasing the at least one resource after receiving the notification message. In an example, the call connection is a call connection for a CSFB call. In another example, the first RAN is an LTE network such as network 12 and the second RAN is a CDMA network such as network 14.

5. Example Benefit of the Disclosed Method and System

The proposed method and system beneficially provides an improved way to manage the release of at least one resource allocated to a UE. In particular, the disclosed method and system may take into account setup of a CSFB call in a second network in order to determine when to release the at least one resource allocated to the UE in a first network. As described above, an example problem with CSFB call setup is that a UE may not receive caller-ID information until the UE is actually within coverage of the second network. Thus, in practice, there is a chance that the UE user may reject the call once the UE is in coverage of the second network. The disclosed method and system provides for the second network notifying the first network when the call has been connected to the UE, and the first network then releasing certain resources allocated to the UE (e.g. bearers), but otherwise maintaining those resources to allow for the possibility that the UE will reject the call and return to coverage of the first network.

Beneficially, the disclosed method and system overcomes example problems associated with releasing the at least one resource in response to the UE transitioning from being served by the first network to being served by the second network, as well as example problems associated with releasing the at least one resource a set time period after the UE transitions from being served by the first network to being served by the second network. For example, by waiting to release the at least one resource until receiving notification that setup of the CSFB call between the UE and the call destination is complete, the first network may beneficially maintain the resources for the UE in the event that the UE cancels or rejects the CSFB call. As another example, by releasing the at least one resource allocated to the UE in response to receiving the notification message, the first network may free up resources more efficiently than freeing up resources by merely releasing resources after a set time period after the UE transitioning from the first network to the second network.

Further, by providing this improved way to manage release of resources in CSFB scenarios, the disclosed method and system may in turn improve service quality for UEs operating in a wireless network. Therefore, the disclosed method and system can help to improve service quality overall for users, thus increasing user satisfaction with wireless performance.

6. Conclusion

Exemplary embodiments have been described above. Those skilled in the art will understand, however, that changes and modifications may be made to these embodiments without departing from the true scope and spirit of the invention.

We claim:

1. In a communication system comprising a first network configured to serve user equipment devices (UEs) according to a first air interface protocol and a second network configured to serve UEs according to a second air interface protocol, a method comprising:

the first network serving a UE, wherein the first network serving the UE comprises the first network allocating at least one resource to the UE;

the first network signaling to invoke setup of a circuit-switched-fallback (CSFB) call between the UE and a call destination via the second network, wherein the UE transitions from being served by the first network to being served by the second network; and after the UE has transitioned from being served by the first network to being served by the second network, (i) the first network initially maintaining for the UE the at least one resource allocated to the UE, (ii) the first network receiving from the second network a notification message indicating that setup of a call connection between the UE and the call destination via the second network is complete, and (iii) in response to receiving the notification message, the first network releasing the at least one resource allocated to the UE.

2. The method of claim 1, wherein the at least one resource comprises a bearer resource.

3. The method of claim 1, wherein the first network signals to invoke setup of the CSFB call between the UE and the call destination via the second network in response to the call destination originating a call to the UE.

4. The method of claim 1, wherein the UE originates the CSFB call.

5. The method of claim 1, wherein the first network includes a mobility management entity (MME), and wherein the signaling to invoke setup of the CSFB call between the UE and a call destination via the second network comprises signaling that results in the MME invoking setup of the CSFB call.

6. The method of claim 5, wherein the second network includes a switch providing connectivity with a public switched telephone network (PSTN), wherein the MME is communicatively linked with the switch via an interworking server (IWS), and wherein the MME invoking setup of the CSFB call comprises signaling from the MME to the switch via the IWS to cause the switch to (i) page the UE to cause the UE to transition to be served by the second network and (ii) connect the CSFB call between the UE and the destination via the PSTN.

7. The method of claim 1, wherein the first network includes a mobility management entity (MME), wherein the second network includes a mobile switching center (MSC), wherein the MME is communicatively linked with the MSC via an interworking server (IWS), and wherein the first network receiving from the second network a notification message indicating that setup of the call connection between the UE and the call destination via the second network is complete comprises the MME receiving the notification message from the MSC via the IWS.

8. The method of claim 1, wherein the first network is a Long Term Evolution (LTE) network, and wherein the second network is selected from the group consisting of a Code Division Multiple Access (CDMA) network and a Global System for Mobile Communications (GSM) network.

9. In a communication system comprising a first network configured to serve user equipment devices (UEs) according to a first air interface protocol and a second network configured to serve UEs according to a second air interface protocol, a method comprising:
the first network serving a UE, wherein the first network serving the UE comprises the first network allocating at least one resource to the UE;
the first network signaling to invoke setup of a circuit-switched-fallback (CSFB) call between the UE and a call destination via the second network, wherein the UE transitions from being served by the first network to being served by the second network; and
after the UE has transitioned from being served by the first network to being served by the second network, (i) if the UE completes setup of a call connection between the UE and the call destination via the second network, the first network releasing the at least one resource in response to the UE completing setup of the call connection, but (ii) if the UE does not complete setup of a call connection between the UE and the call destination via the second network and the UE transitions from being served by the second network back to being served by the first network, the first network using the allocated at least one resource to serve the UE after the UE transitions back to being served by the first network,
wherein the first network releasing the at least one resource in response to the UE completing setup of the call connection comprises the first network releasing the at least one resource in response to receiving from the second network a notification message indicating that setup of a call connection between the UE and the call destination via the second network is complete.

10. The method of claim 9, wherein the first network signals to invoke setup of the CSFB call between the UE and the call destination via the second network in response to the call destination originating a call to the UE.

11. The method of claim 10, wherein the UE does not complete the setup of the call connection as a result of the UE rejecting the call.

12. The method of claim 9, wherein the at least one resource comprises a bearer resource.

13. The method of claim 9, wherein the first network is a Long Term Evolution (LTE) network, and wherein the second network is selected from the group consisting of a Code Division Multiple Access (CDMA) network and a Global System for Mobile Communications (GSM) network.

14. In a communication system comprising a first radio access network (RAN) configured to serve user equipment devices (UEs) according to a first air interface protocol and a second RAN configured to serve UEs according to a second air interface protocol, wherein the first RAN has at least one resource allocated for the UE to be served by the first RAN, a method comprising:
the second RAN serving the UE, wherein the second RAN serving the UE comprises (i) the second RAN and the UE signaling to complete setup of a call connection between the UE and a call destination and (ii) the second RAN completing the setup of the call connection between the UE and the call destination;
the second RAN sending to the first RAN a notification message indicating that setup of the call connection between the UE and the call destination is complete;
the first RAN receiving from the second RAN the notification message; and
after receiving the notification message, the first RAN releasing the at least one resource allocated for the UE to be served by the first RAN.

15. The method of claim 14, wherein the call connection is a call connection for a circuit-switched-fallback (CSFB) call.

16. The method of claim 14, wherein the at least one resource comprises a bearer resource.

17. The method of claim 14, wherein the first RAN is a Long Term Evolution (LTE) network, and wherein the second RAN is selected from the group consisting of a Code Division Multiple Access (CDMA) network and a Global System for Mobile Communications (GSM) network.

18. The method of claim 1, wherein, after the UE has transitioned from being served by the first network to being served by the second network and before the first network receiving the notification message indicating that setup of the call connection between the UE and the call destination via the second network is complete, the second network and the UE signal with one another and complete setup of the call connection between the UE and the call destination.

* * * * *